US00RE43883E

(19) United States
(12) Reissued Patent
McCarthy et al.

(10) Patent Number: US RE43,883 E
(45) Date of Reissued Patent: Dec. 25, 2012

(54) HIGH EFFICIENCY, ERROR MINIMIZING CODING STRATEGY METHOD AND APPARATUS

(75) Inventors: Steve McCarthy, Johnstown, CO (US); John Seabury, Erie, CO (US)

(73) Assignee: Seagate Technology LLC, Cupertino, CA (US)

(21) Appl. No.: 13/330,177

(22) Filed: Dec. 19, 2011

Related U.S. Patent Documents

Reissue of:
(64) Patent No.: 7,404,131
Issued: Jul. 22, 2008
Appl. No.: 09/767,894
Filed: Jan. 22, 2001

U.S. Applications:
(62) Division of application No. 12/840,974, filed on Jul. 21, 2010.

(51) Int. Cl.
*H03M 13/00* (2006.01)

(52) U.S. Cl. ..... 714/758; 714/799; 714/702; 714/742

(58) Field of Classification Search ..... 714/702, 714/742, 752, 758, 799
See application file for complete search history.

(56) References Cited

U.S. PATENT DOCUMENTS

| | | | | | |
|---|---|---|---|---|---|
| 5,802,118 | A * | 9/1998 | Bliss et al. | 375/350 |
| 5,856,986 | A * | 1/1999 | Sobey | 714/744 |
| 6,040,953 | A * | 3/2000 | Malone et al. | 360/53 |
| 6,097,320 | A * | 8/2000 | Kuki et al. | 341/58 |
| 6,158,027 | A * | 12/2000 | Bush et al. | 714/709 |
| 6,201,840 | B1 * | 3/2001 | Rub et al. | 375/341 |
| 6,240,538 | B1 * | 5/2001 | Dent et al. | 714/762 |
| 6,353,315 | B1 * | 3/2002 | Egan et al. | 324/212 |
| 6,373,407 | B1 * | 4/2002 | Nishiya et al. | 341/59 |
| 6,400,728 | B1 * | 6/2002 | Ott | 370/465 |
| 6,446,234 | B1 * | 9/2002 | Cox et al. | 714/758 |
| 6,530,055 | B1 * | 3/2003 | Fukunaga | 714/746 |
| 6,546,515 | B1 * | 4/2003 | Vary et al. | 714/746 |
| 6,556,615 | B1 * | 4/2003 | Pon | 375/130 |

* cited by examiner

*Primary Examiner* — Esaw Abraham
(74) *Attorney, Agent, or Firm* — Crawford Maunu PLLC

(57) ABSTRACT

A method for creating a high efficiency, error minimizing code is provided. In addition, an apparatus having a high efficiency, error minimizing code is provided. In particular, the present invention provides a high efficiency, error minimizing code for use in connection with systems having a communication channel in which identifiable dominant errors occur, and that is used to transmit data that may be usefully applied in the system even though the received signal is not exactly equal to the original signal. Furthermore, the present invention provides a code that may be used to constrain the effects of dominant errors in a communication channel.

16 Claims, 7 Drawing Sheets

| 400 USER VALUE | 404 BINARY CODE DECIMAL EQUIVALENT | 408 BINARY CODE | 412 NEIGHBORS | 416 MAXIMUM VARIANCE |
|---|---|---|---|---|
| 0 | 0 | 00000 | | |
| 1 | 1 | 00001 | | |
| 2 | 2 | 00010 | 10 | +8 |
| 3 | 3 | 00011 | 11, 10, 2 | +8 |
| 4 | 4 | 00100 | 20, 21, 5 | +17 |
| 5 | 5 | 00101 | 21 | +16 |
| 6 | 6 | 00110 | 22 | +16 |
| 7 | 7 | 00111 | 5, 21, 23 | +16 |
| 8 | 8 | 01000 | 10 | +2 |
| 9 | 9 | 01001 | | |
| 10 | 10 | 01010 | | |
| 11 | 11 | 01011 | 10 | -1 |
| 12 | 12 | 01100 | 13 | +1 |
| 13 | 13 | 01101 | | |
| 14 | 14 | 01110 | 10 | -4 |
| 15 | 15 | 01111 | | |
| 16 | 16 | 10000 | | |
| 17 | 17 | 10001 | 21 | +4 |
| 18 | 18 | 10010 | | |
| 19 | 19 | 10011 | 18 | -1 |
| 20 | 20 | 10100 | 21 | +1 |
| 21 | 21 | 10101 | | |
| 22 | 22 | 10110 | | |
| 23 | 23 | 10111 | 21 | -2 |
| 24 | 24 | 11000 | 26, 10, 8 | -16 |
| 25 | 25 | 11001 | 9 | -16 |
| 26 | 26 | 11010 | 10 | -16 |
| 27 | 27 | 11011 | 11, 10, 26 | -16 |
| 28 | 28 | 11100 | 20, 21, 29 | -8 |
| 29 | 29 | 11101 | 21 | -8 |
| 30 | 30 | 11110 | | |
| 31 | 31 | 11111 | | |

FIG. 4

| 800 USER VALUE | 804 BINARY CODE DECIMAL EQUIVALENT | 808 BINARY CODE | 812 NEIGHBORS | 816 MAXIMUM VARIANCE |
|---|---|---|---|---|
| 0 | 0 | 00000 | | |
| 1 | 1 | 00001 | | |
| 2 | 2 | 00010 | | |
| 3 | 3 | 00011 | 4, 2 | ±1 |
| 24 | 4 | 00100 | 25, 23 | ±1 |
| 23 | 5 | 00101 | | |
| 9 | 6 | 00110 | 10 | ±1 |
| 22 | 7 | 00111 | 23, 21 | ±1 |
| 8 | 8 | 01000 | | |
| 15 | 9 | 01001 | | |
| — | — | — | | |
| 4 | 11 | 01011 | | |
| 12 | 12 | 01100 | 13 | +1 |
| 13 | 13 | 01101 | | |
| 11 | 14 | 01110 | | |
| 20 | 15 | 01111 | | |
| 16 | 16 | 10000 | | |
| 17 | 17 | 10001 | | |
| 18 | 18 | 10010 | | |
| 19 | 19 | 10011 | 18 | -1 |
| 25 | 20 | 10100 | | |
| — | — | — | | |
| 10 | 22 | 10110 | | |
| 21 | 23 | 10111 | | |
| 7 | 24 | 11000 | 6 | -1 |
| 14 | 25 | 11001 | 15 | +1 |
| 6 | 26 | 11010 | | |
| 5 | 27 | 11011 | 4, 6 | ±1 |
| 26 | 28 | 11100 | 25, 27 | ±1 |
| 27 | 29 | 11101 | | |
| 28 | 30 | 11110 | | |
| 29 | 31 | 11111 | | |

FIG. 8

| 900 USER VALUE | 904 BINARY CODE DECIMAL EQUIVALENT | 908 BINARY CODE | 912 NEIGHBORS | 916 MAXIMUM VARIANCE |
|---|---|---|---|---|
| 0 | 0 | 00000 | | |
| 1 | 1 | 00001 | | |
| 2 | 2 | 00010 | | |
| 3 | 3 | 00011 | 4, 2 | ±1 |
| 24 | 4 | 00100 | 25, 23 | ±1 |
| 23 | 5 | 00101 | | |
| 9 | 6 | 00110 | 10 | ±1 |
| 22 | 7 | 00111 | 23, 21 | ±1 |
| 8 | 8 | 01000 | | |
| 15 | 9 | 01001 | | |
| — | — | — | | |
| 4 | 11 | 01011 | | |
| 12 | 12 | 01100 | 13 | +1 |
| 13 | 13 | 01101 | | |
| 11 | 14 | 01110 | | |
| 20 | 15 | 01111 | | |
| 16 | 16 | 10000 | | |
| 17 | 17 | 10001 | | |
| 18 | 18 | 10010 | | |
| 19 | 19 | 10011 | 18 | -1 |
| 25 | 20 | 10100 | | |
| — | — | — | | |
| 10 | 22 | 10110 | | |
| 21 | 23 | 10111 | | |
| 7 | 24 | 11000 | 6 | -1 |
| 14 | 25 | 11001 | 15 | +1 |
| 6 | 26 | 11010 | | |
| 5 | 27 | 11011 | 4, 6 | ±1 |
| 26 | 28 | 11100 | 25, 27 | ±1 |
| 27 | 29 | 11101 | | |
| 28 | 30 | 11110 | 29 | +1 |
| 29 | 30 | 11110 | 28 | -1 |
| 30 | 31 | 11111 | 31 | +1 |
| 31 | 31 | 11111 | 30 | -1 |

FIG. 9

HIGH EFFICIENCY, ERROR MINIMIZING CODING STRATEGY METHOD AND APPARATUS

Matter enclosed in heavy brackets [ ] appears in the original patent but forms no part of this reissue specification; matter printed in italics indicates the additions made by reissue.

*RELATED PATENT DOCUMENTS*

*More than one reissue application has been filed for the reissue of U.S. Pat. No. 7,404,131. The reissue applications are application Ser. No. 13/330,177 filed Dec. 19, 2011 (the present application), which is a divisional reissue of U.S. Pat. No. 7,404,131), and Ser. No. 12/840,974 filed Jul. 21, 2010, which is a reissue application of U.S. Pat. No. 7,404,131.*

FIELD OF THE INVENTION

The present invention relates to coding data. In particular, the present invention relates to a method and apparatus for encoding data that is highly efficient, and that minimizes the effect of errors.

BACKGROUND OF THE INVENTION

Coding schemes are regularly used in connection with the transmission of data. For example, in digital communication systems, data is typically transmitted as a series of code words. In general, each code word is assigned a unique pattern of bits, with each bit consisting of either a zero or a one. In most such digital communication systems, the number of bits that may be used to define code words is limited. Therefore, it is desirable to encode data such that a maximum number of code words (i.e., bit patterns) are available as code words. It is also desirable to reduce the effect of errors that may occur in transmitting code words across the communication channel.

In many digital systems, errors in the detection, transmission or reading of bit patterns may occur. For example, certain bit patterns may result, on occasion, in certain bits being "flipped." The particular bit patterns that are susceptible to flipping are generally determined by the system under consideration. Such errors may be identified as dominant errors if they are much more likely to occur than errors due to random effects, such as noise.

In a typical coding scheme, a code word that is read incorrectly due to the occurrence of a dominant error can result in a very large discrepancy. That is, the value of the original code word can be very different from the code word that is actually read. In general, this is because the strategies used to assign values to code words do not take into consideration the dominant errors that may be associated with a system.

Modulation codes have been used to aid in the transmission and reception of data. Such codes are designed to avoid code words that are particularly susceptible to being misread. For example, code words having a string of identical bits of at least a certain length may be susceptible to detecting one or more of the bits as its opposite. A modulation code designed to avoid such a "bit flipping" event may eliminate as valid code words any pattern of bits that includes more than the allowed number of identical bits in a row. However, such "run length limited" codes reduce the efficiency of the code space by eliminating what would otherwise be valid code words.

Coding schemes have also been developed to detect, and in some instances correct, errors that occur during the transmission and reception of the data. Error control codes include parity checking codes and error correction codes. In a typical parity code, an extra bit is assigned to tracking whether the detected code word should contain an even or odd number of '1' bits. Upon detection of the code word, if the parity code does not agree with the code word (e.g., the detected code word contains an even number of 1's, but the parity code indicates that it should contain an odd number of 1's), it can be assumed that an error occurred during transmission or reception of the code word. If the coding scheme used is a simple parity checking scheme, no correction is generally possible, and the received code word is discarded. In a typical error correcting code, more than one parity or error control bit is used to enable at least some errors to be corrected. However, each bit of a code word dedicated to parity checking or to error correction reduces the efficiency of the coding scheme.

As an example of systems that include a communication channel susceptible to dominant errors, a computer hard disk drive system and a voice communication system will be described. However, it should be appreciated that the present invention is not limited to use in connection with such systems, and can generally be applied to any communication system that is susceptible to dominant errors and that can tolerate some deviation between a value as written and a value as read.

With reference now to FIG. 1, a typical disk drive system 100 is illustrated. The disk drive system 100 is operative for performing data storage and retrieval functions in connection with an external host computer (not illustrated in FIG. 1). The disk drive 100 generally includes a base 104 and magnetic disks 108 (only one of which is shown in FIG. 1). The magnetic disks 108 are interconnected to the base 104 by a spindle motor (not shown) located within or beneath the hub 112, such that the disk 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor 128 pivots the actuator arm assemblies 116 about the bearing 120 to radially position the transducer heads 124 with respect to magnetic disks 108. Voice coil motor 128 is operated by a controller 132 that is in turn operatively connected to the host computer (not shown). By changing the position of the transducer heads 124 with respect to the magnetic disk 108, the transducer heads 124 may address different tracks or cylinders 136 on the magnetic disk 108. The disk drive 100 also generally includes a channel 138 for receiving and decoding data read from the disk 108 by the transducer heads 124.

Typically, the data is stored in the concentric tracks 136 as a series of magnetic transitions. In an ideal disk drive system 100, the tracks 136 are non-perturbed circles situated about the center of the disk 108. As such, each of these ideal tracks includes a track centerline that is located at a known constant radius from the disk center. In an actual system, however, it is difficult to write non-perturbed circular tracks 136 to the data storage disk 108. That is, problems such as vibration, bearing defects, inaccuracies in the servo track writer used to write the tracks 136 and disk clamp slippage can result in tracks 136 that are written differently from the ideal non-perturbed circular track shape. The resulting inaccuracies in the shape of the tracks 136 due to such errors is known as written-in and repetitive runout. The perturbed shape of these tracks 136 complicates the positioning of the transducer heads 124 during read and write operations because the disk drive servo system needs to continuously reposition the transducer heads 124 during track following.

In order to at least partially correct the shape of the tracks 136 and to minimize the effects of written-in and repetitive runout, the tracks 136 are periodically encoded with embedded run-out correction (ERC) values. In particular, the embedded run-out correction values serve as corrections to the position error signal (PES) generated during track following.

Although the correction values stored in the ERC fields represent discrete correction amounts, the amount of correction need not be precisely read in order to usefully alter the position error signal read from a track 136 during track following. However, conventional disk drive systems utilizing embedded run-out correction typically discard embedded runout correction values that are not correctly detected by a detector included as part of the channel 138. Accordingly, previous systems have treated embedded runout correction values, which can tolerate at least some variance between the value as originally written and the value as detected, in the same way as user data, which generally must be discarded if errors in the reading of such data occur. Therefore, such conventional methods result in inefficiencies and/or the loss of useful data.

As a further example of a system that includes a communication channel susceptible to dominant errors but that tolerates some variance between an intended value and a received value, consider a digital voice communication system. In general, a human listener is capable of comprehending the meaning of another's speech, even though small portions of the conversation are lost, for example, due to transmission errors. However, breaks in an audible signal due to such errors are annoying and can make a conversation difficult or impossible to follow. Furthermore, typical communication channels used for transmitting voice data are susceptible to dominant errors. In addition, such systems must operate with high efficiency in order to be economical. Therefore, communication systems used for the transmission of voice data could benefit from a coding strategy that minimized the effect of dominant errors in the communication channel, while reducing or eliminating the need to transmit redundant code.

As mentioned above, modulation and error control coding schemes require the recordation and transmission of redundant information in addition to the user data. Although this redundant information allows for the reduction, detection or correction of errors in the transmission of user data, the storage and/or transmission capacity of the system is reduced. In addition, errors that are not detected result in values that may be very different from the intended value. Furthermore, errors that are detected but are not corrected may result in a code word being discarded, with no benefit being derived from the transmission of the discarded data. Therefore, it would be advantageous to provide a coding strategy that was highly efficient, and that minimized the effects of errors. In addition, it would be advantageous to provide a system that could be implemented at low cost, and that was reliable in operation.

SUMMARY OF THE INVENTION

In accordance with the present invention, a high efficiency, error minimizing coding strategy is provided. The present invention may be used in connection with any system that is susceptible to at least one dominant error in the transmission of data, and that can tolerate at least some deviation between a user value as recorded or transmitted and a user value as read or received. The coding strategy of the present invention allows data to be encoded such that errors are minimized, while maximizing the efficiency of the system.

According to one embodiment of the present invention, the dominant error or errors present in the communication channel of a system are identified. A list of code words of a length accommodated by the system is prepared, and each code word in the list is analyzed to determine its neighbor words. A neighbor word is the code word that is read by the system if a dominant error occurs during the reading or transmission of the code word under analysis. In addition, the code words may be grouped according to code words that are interdependent on one another. A code word is interdependent with another code word if one of the code words is a neighbor of the other, or is related to the other code word because they are part of the same web or chain of neighbor words. Also, a maximum tolerable deviation range between a user value as encoded and a user value as decoded should be determined. If any group of code words includes a word that is directly interdependent with (i.e. is a neighbor of or to) a number of neighbor words greater than two times the range of the maximum tolerable deviation between the user value as intended and the user value as received, a code word or words is removed from the coding scheme. The particular code word or words removed is chosen so that the requirement that no one code word is a neighbor of or to more than two times the maximum tolerable deviation range is met without removing more code words than is necessary. The code words may again be grouped according to code words that are interdependent. Each code word in a group of code words may then be assigned a user value such that if a dominant error causes a first code word to be read as a second code word, the difference between the user value of the intended code word is within the range of tolerable deviation from the user value of the code word that was read. Any code words not belonging to any group may be assigned to any remaining user values.

According to one embodiment of the present invention, a plurality of user values may be assigned to a single code word, so long as the user values are within the maximum tolerable deviation between user values established for the system.

According to another embodiment of the present invention, a first dominant error event for a communication channel is identified. A range of user values corresponding to a maximum tolerable user value error is also determined. Next, a first user value is assigned to a first code word. A second user value, within the maximum tolerable user value error from the first user value is assigned to a second code word. The second code word is the word that is read as a result of the occurrence of the first dominant error upon the transmission of the first code word across the communication channel. In addition, a third user value may be assigned to a third code word. The third user value is, according to an embodiment of the present invention, outside of the range of user values corresponding to a maximum tolerable user value error. Furthermore, the first code word is not read as the third code word if the first dominant error occurs.

According to still another embodiment of the present invention, a second dominant error for the communication channel is identified. A user value may be assigned to the second code word that results if the second dominant error occurs during transmission of the first code word. According to the present invention, the user value assigned to the second code word should have a value that is within the range of maximum tolerable user value error from the first code word.

According to a further embodiment of the present invention, an apparatus having or using data encoded according to an error minimizing scheme is provided. The apparatus includes a channel that is subject to at least a first dominant transmission error. The apparatus further includes a decoder in which a first code word is read as a second code word upon an occurrence of the first dominant error. The second code word has a user value that is within a range of user values corresponding to a tolerable amount of error in the apparatus from the first code word. According to still another embodiment of the present invention, the occurrence of the first dominant transmission error does not result in the first code word being read as any code word that is outside of the range of tolerable error in user values.

Based on the foregoing summary, a number of salient features of the present invention are readily discerned. A method for providing a high efficiency, error minimizing code is provided. The method enables a system having a dominant error or errors and that can tolerate at least some deviation between user values or data as stored or transmitted and user values or data as read or received to operate with high efficiency. Furthermore, the method of the present invention allows the maximum deviation between user values or data as stored or transmitted and user values as read or received due to a dominant error to be constrained to a chosen deviation amount. In addition, the present invention provides an apparatus in which errors in the transmission or reading of user values or data results in user values that are within a defined maximum tolerable deviation. The apparatus achieves this without requiring the use of redundant data.

Additional advantages of the present invention will become readily apparent from the following discussion, particularly when taken together with the accompanying drawings.

BRIEF DESCRIPTION OF THE DRAWINGS

FIG. 4 illustrates a five bit code and the neighbor words that occur as a result of exemplary first and second dominant errors;

FIG. 8 is a table illustrating an example coding scheme in accordance with an embodiment of the present invention; and FIG. 9 is a table illustrating an example coding scheme in accordance with another embodiment of the present invention.

DETAILED DESCRIPTION

Figure 1:
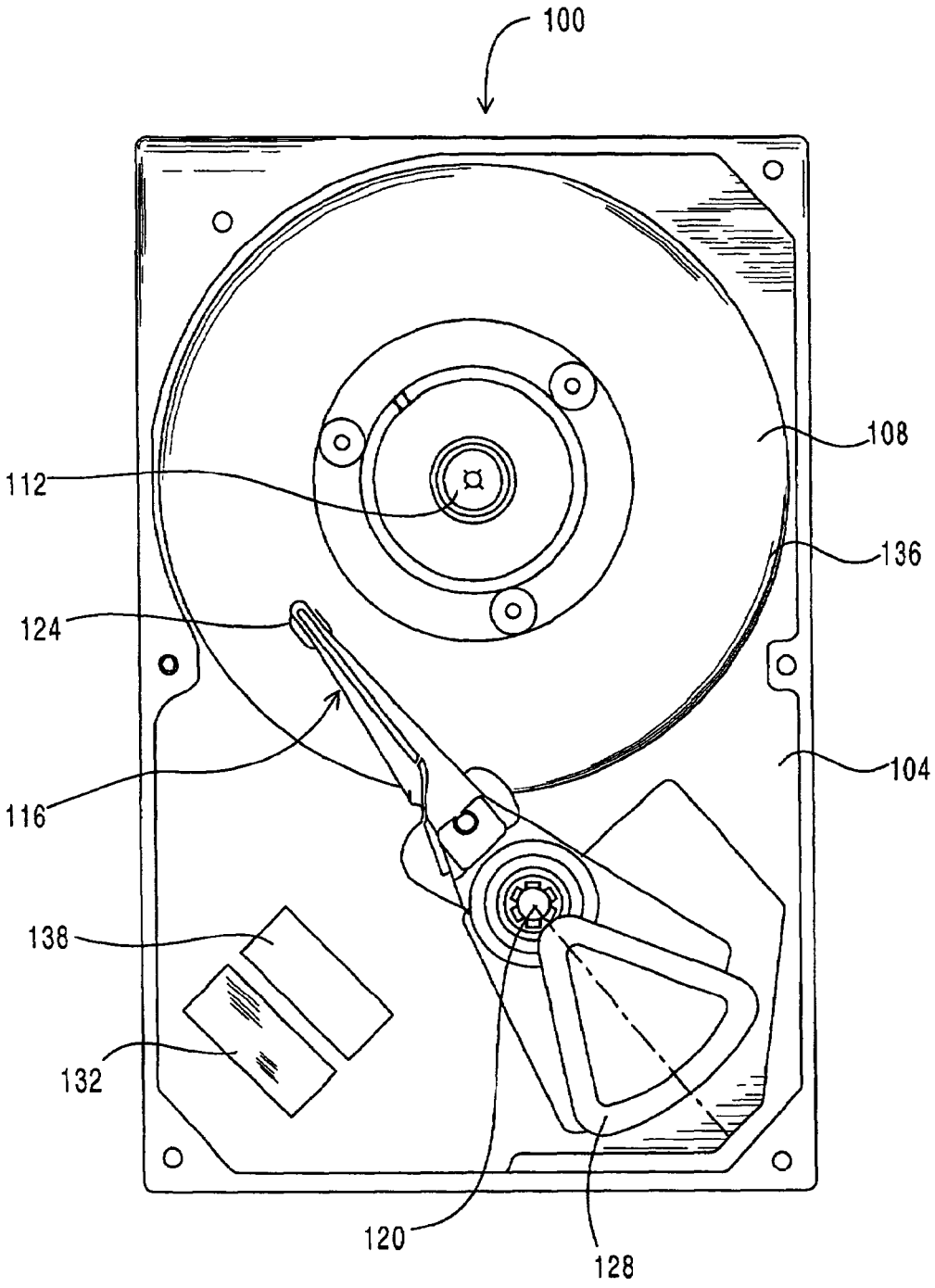
FIG. 1 is a top view of a conventional computer disk drive, with the cover removed.
Figure 2:
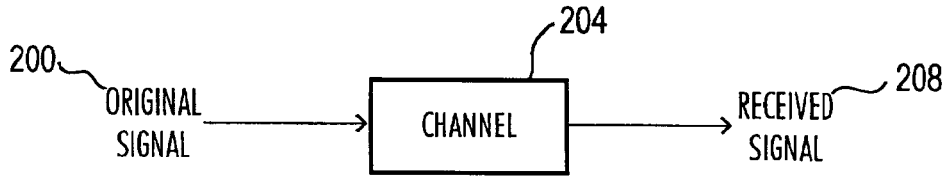
FIG. 2 is a block diagram depicting the relationship between an original signal, a communication channel and a received signal.

With reference now to FIG. 2, the relationship between an original signal 200, a communication channel 204 and a received signal 208 is illustrated. In general, the original signal 200 is subject to alteration by the communication channel 204 to result in a received signal 208 that is not identical to the original signal 200. As will be appreciated by those of ordinary skill in the art, the original signal 200 may be a signal read from storage, or a signal provided for transmission. As will further be appreciated by those of ordinary skill in the art, the communication channel 204 may comprise any apparatus for conveying information. Examples of communication channels 204 include voice data transmission systems, such as the plain old telephony system, a wireless communication channel for transmitting voice or data, a computer network, or a read element in combination with a detector, such as the transducer head 124 of a disk drive 100 in combination with a detector included as part of the disk drive channel 138.

According to the present invention, communication channel 204 must be subject to an identifiable dominant error or set of errors. A dominant error is an error having a high probability of occurrence. In particular, a dominant error has a much higher probability of occurrence than a non-dominant error. More particularly, a dominant error has a higher probability of occurrence than a random error. Furthermore, a dominant error is distinct from a random error in that the effect of an occurrence of a dominant error has a particular and identifiable effect.

Figure 3:
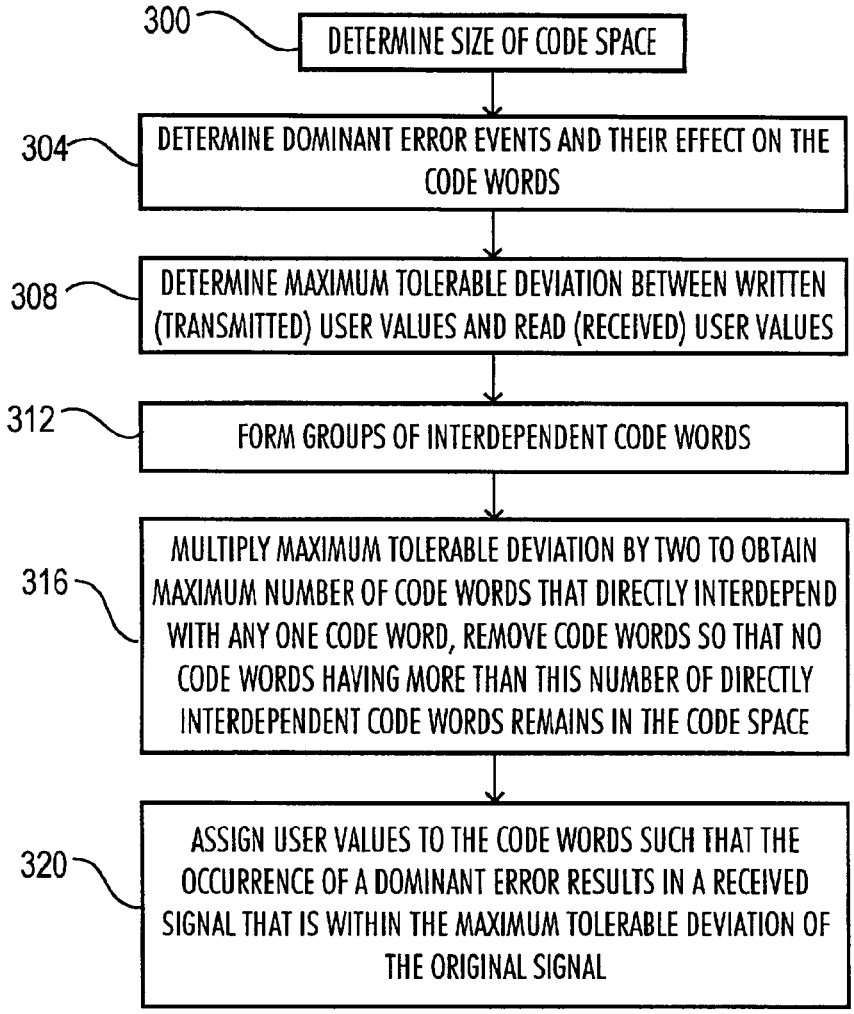
FIG. 3 is a flowchart illustrating the implementation of a high efficiency, error minimizing coding scheme in accordance with an embodiment of the present invention.

With reference now to FIG. 3, an initial step in producing a code in accordance with the present invention is to determine the size of the code space (step 300). In general, the code space of a system is equal to the base or radix (r) of the number system used to the $q^{th}$ power ($r^q$), where q is the number of digits supported by the code. For example, a system that is binary and that uses q number of bits in each word has a code space of $2^q$. The code space of the system is initially equal to the data space, as at this point it is assumed that all of the code space is available for association with user values or data.

Another initial step in preparing a code in accordance with the present invention is to determine the dominant error events in the system, and the effect that occurrence of each of the dominant error events has on the code words (step 304). In particular, those code words that are susceptible to being altered by the occurrence of a dominant error are identified. If the system is capable of transmitting code words sequentially, the effect of dominant error events on the code words must be determined when the code word is concatenated with other code words, as well as when the code word is transmitted across the channel singly.

As yet another initial step, the maximum tolerable deviation between a user value as written or transmitted and that user value as read or received is determined. According to the present invention, alterations to code words due to dominant errors result in received signals 208 having values that are the same or close (i.e. within the maximum tolerable deviation) to the values of the original signals 200. In general, the greater the range of tolerable deviation, the more efficient the code scheme can be. That is, usually fewer code words will need to be eliminated as valid code words, as will be explained in greater detail below, if the maximum tolerable deviation is relatively large.

Following the initial steps 300, 304 and 308, which can be taken in any order, the code words that are susceptible to alteration by the identified dominant errors are placed into groups of interdependent code words (step 312). In general, groups of interdependent code words are formed from code words that are neighbor words or that are related to one another through one or more neighbor words. A first code word is a neighbor of a second code word if the occurrence of one or more dominant errors in the communication channel 204 causes the first code word to be read or received as the second code word. In developing a code in accordance with the present invention, it is convenient to develop state diagrams consisting of interdependent code words, as will be explained below.

As a next step, the maximum tolerable deviation between user values as written and user values as received may be multiplied by two to determine the maximum number of code words that can directly interdepend with any one code word (step 316). Code words are directly interdependent if one code word is the neighbor of another code word. If this maximum number of directly interdependent code words is exceeded, code words are removed from the code space so that no code word having more than this number of directly interdependent code words remains in the code space.

User values are then assigned to the code words such that the occurrence of a dominant error in the transmission of an original signal 200 results in a received signal 208 that is within the maximum tolerable deviation of the original signal (step 320). In this way, the occurrence of a dominant error in the communication channel 204 results in a user value that is acceptably close to the user value of the original signal 200. Accordingly, the coding scheme constrains the effect of dominant errors in a communication channel 204, such that a useful user value is provided to the system despite the occurrence of a dominant error or errors. Furthermore, the coding strategy of the present invention achieves this without requiring the use of redundant bits.

As an example of dominant errors, the channel 204 of a system using a five bit binary code space may have a first dominant error event that transforms an original signal 200 of 10001 to a received signal 208 of 10101. That is, the first dominant error, according to this example, results in flipping the middle of three bits having a value of zero and bounded on either side by bits having a value of 1. In addition, the channel 204 of the system may have a second dominant error that transforms an original signal 200 of 01110 to a received signal 208 of 01010. That is, the second dominant error results in the flipping of the middle bit when three bits having a value of one are bounded on either side by bits having a value of 0.

Where code words are capable of being transmitted in series, the effect of dominant error events must be considered for each code word when it is concatenated with any other code word. For example, a code word having an original signal equal to 00011, having a decimal equivalent of 3, can be read as received signal 01011, having a decimal equivalent of 11, when a code word ending in 1 precedes the original signal and the first dominant error event occurs. Likewise, a received signal of 00010 can result when the original signal of 00011 is followed by a code word having a first bit equal to 1 and a second bit equal to 0 and the second dominant error event occurs. In addition, an original signal of 00011 can result in a received signal of 01010 if the code word is preceded by another code word ending in one and the first dominant error occurs, and is followed by a code word beginning with the bits 10 and the second dominant error also occurs.

With reference now to FIG. 4, a five bit code having user values equal to the decimal equivalent of the binary code is illustrated. In particular, column 1 illustrates user values 400 and the second column contains the binary code decimal equivalent 404 for each code word 408. According to the code illustrated in FIG. 4, the user values 400 are equal to the binary code decimal equivalents 404 of the code words 408. The third column contains the code words 408 in binary code. The fourth column 412 identifies the user values 400 of neighbor words for each code word 408. For the code illustrated in FIG. 4, the communication channel 204 of the system is assumed to have two dominant errors, in which the first dominant error transforms an original signal 200 of 10001 to a received signal 208 of 10101, and in which a second dominant error transforms an original signal 200 of 01110 to a received signal 208 of 01010. Given these two dominant errors, none of the code words has more than three neighbors 412. The last column in FIG. 4 shows the maximum variance 416 between the user value 400 of the original signal 200 and the user value 400 of the received signal or signals 200.

As is evident from the maximum variance 416 values for the code illustrated in FIG. 4, certain of the code words 400 may be transformed by the occurrence of a dominant error into a neighbor code word having a user value 400 that is 16 less or 17 more than the user value 400 of the original code word. For example, an original signal 200 having a binary code 408 of 11011 and a user value 400 of 27, may be transformed into a received signal 208 having a binary code 408 of 01010 and a user value 400 of 10 if it is preceded by a code word ending in 01 and the second dominant error then occurs. Similarly, an original signal 200 having a binary code 408 of 00100 and a user value 400 of 4 may be transformed into a received signal 208 having a binary code 408 of 10101 and a user value 400 of 21 if it is preceded by a code word ending in 10 and succeeded by a code word beginning in 01, and the first dominant error of the communication channel 204 occurs twice.

With reference now to FIGS. 5A-5F, groups of interdependent code words from the example code illustrated in FIG. 4 are shown. As depicted in FIGS. 5A-5F, the groups of interdependent code words may be considered as state diagrams, in which movement within the group results from the occurrence of one or both of the dominant error events for the system. In general, the groups depicted in FIGS. 5A-5F are formed by grouping code words and their related directly interdependent code words (i.e. neighbor words) to form a larger group of interdependent code words.

Figure 5A:
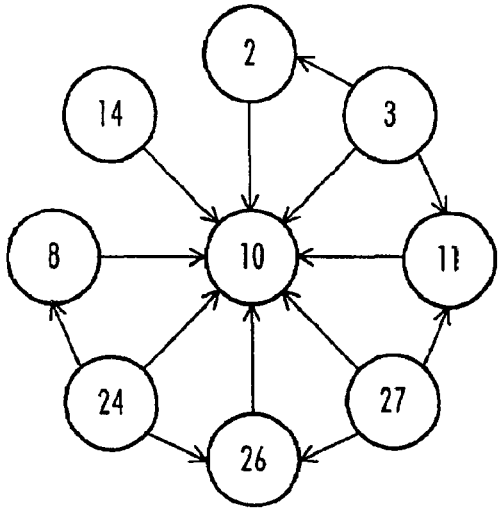
FIGS. 5A-5F illustrate groups of interdependent code words from the example in FIG. 4.
Figure 5B:
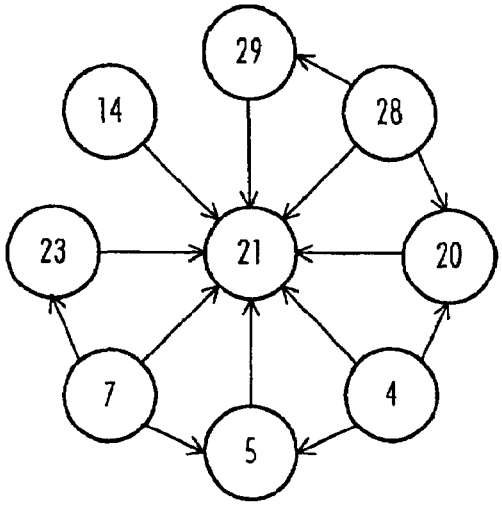
Figure 5C:
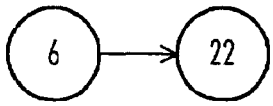
Figure 5E:
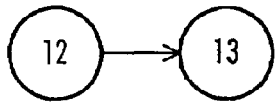
Figure 5D:
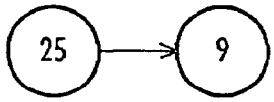
Figure 5F:
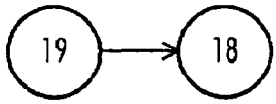

With reference now to FIG. 5A, it can be seen that an original signal 200 that includes any one of eight different binary codes 408 can result in a received signal 208 having a binary code decimal equivalent 404 of 10. Similarly, as shown in FIG. 5B, any one of eight different binary codes 408 can be altered in the channel 204 by the occurrence of one or more of the dominant events so that the received signal 208 has a binary code decimal equivalent 404 of 21. As illustrated in FIGS. 5C-5F, the occurrence of a particular code word 408 as an original signal 200 may result in a corresponding other received signal 208 upon the occurrence of certain of the dominant error events.

According to the present example, the maximum tolerable deviation between user values is assumed to be one. Therefore, no valid code word 408 may have more than two other code words 408 that are directly interdependent with it. As stated previously, binary codes 408 are considered to be directly interdependent with one another if a first of the code words 408 may be altered by the occurrence of a dominant error in the communication channel 204 such that the received signal 208 is the second of the code words 408.

Because the groups illustrated in FIGS. 5A and 5B each have code words that directly interdepend with more than two other code words, it is necessary to remove code words until this no longer the case. As can be appreciated by considering the groups illustrated in FIGS. 5A and 5B, removing the code words 408 having binary code decimal equivalents 404 of 10 and 21, respectively, would ensure that no single code word 408 was directly interdependent with more than two other code words 408.

Figure 6A:
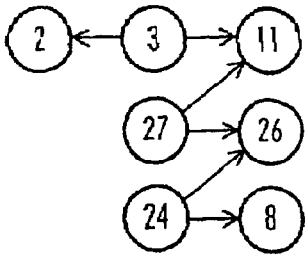
FIGS. 6A-6F illustrate groups of interdependent code words after the elimination of problematic code words from the example of FIG. 4.
Figure 6C:
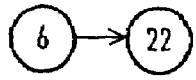
Figure 6D:
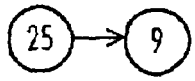
Figure 6B:
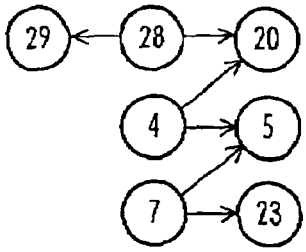
Figure 6E:
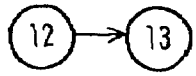
Figure 6F:
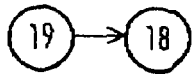
Figure 7A:
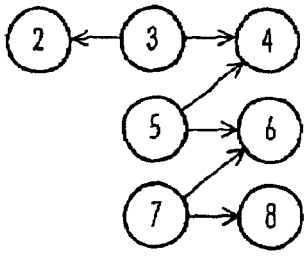
FIGS. 7A-7F illustrate groups of user values corresponding to groups of interdependent code words illustrated in FIGS. 6A-6F.
Figure 7C:
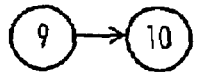
Figure 7D:
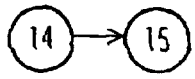
Figure 7B:
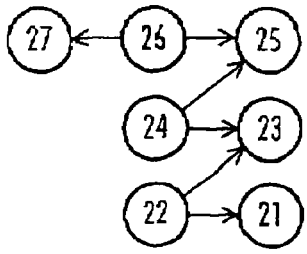
Figure 7E:
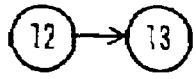
Figure 7F:
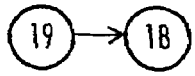

With reference now to FIGS. 6A-6F, the groups of interdependent code words remaining after the code words 408 having binary code decimal equivalents 404 of 10 and 21 were removed are illustrated. In particular, it can be seen that removing the binary code having a decimal equivalent 404 of 10 results in a chain of code words 408 in which the greatest number of code words directly interdependent with any one code word is two. (FIGS. 5A and 6A). That is, no one code word 408 has more than two neighbor words. Likewise, the removal of the code word having a decimal equivalent 404 of 21 from the second group results in a chain of code words 408 in which no more than two code words directly interdepend with any one code word (FIGS. 5B and 6B). It will further be noted that FIGS. 5C-5F are identical to FIGS. 6C-6F. This is because the groups illustrated in FIGS. 5C-5F had no code words with which more than two other code words interdepended, and therefore no code words within those groups were removed from the code space.

As explained above, according to one embodiment of the present invention, user values 400 must next be allocated to the code words remaining in the code space. In particular, user values 400 should be allocated such that the occurrence of one or more dominant errors during the transmission of an original signal 200 results in a received signal 208 having a user value within the maximum tolerable deviation of the user value of the original signal 200.

With reference now to FIGS. 7A-7F, examples of how user values 400 may be assigned to the code words included in the groups illustrated in FIGS. 6A-6F is shown. In general, because in the present example the maximum tolerable deviation is one user value, the user values are assigned in linear series such that movement among the states of each group due to the occurrence of one or more dominant errors results in a received signal 208 that is within the maximum tolerable deviation.

With reference now to FIG. 8, the user values 800, binary code decimal equivalents 804, and binary codes 808 incorporating the assignment of user values shown in FIGS. 7A-7F to the groups of binary codes shown in FIGS. 6A-6F are illustrated. For those code words 808 that did not appear as part of a group of interdependent code words (FIGS. 6A-6F), the assignment of user values 800 may be random. In column 812, the neighbors, in terms of user value 800, is noted for each code word 808. The maximum variance for the code words 808 having neighbors 812, in terms of the difference in user values, is summarized in column 816. From FIG. 8, it can be appreciated that the maximum user value variance 816 between an original signal 200 and a received signal 208 due to the occurrence of one or more of the dominant events identified for the communication channel 204 of the system is +/−1. Accordingly, the maximum variance in the user value 800 has been constrained to the maximum tolerable variance defined for the system.

In the example code illustrated in FIG. 8, two code words were eliminated in order to achieve the desired maximum tolerable deviation. As a result, 30 user values 800 are available, yielding an effective code space of $\log_2$ (30)=4.9 bits. This compares to a code space consisting of 12 valid code words resulting in a $\log_2$ (12)=3.5 bit code space if the code words susceptible to alteration due to the occurrence of a dominant error were removed from the initial code illustrated in FIG. 4.

According to one embodiment of the present invention, the ability of the system to tolerate at least some deviation between the original signal 200 and the received signal 208 may be used to increase the efficiency of the code scheme. For example, up to two user values may be assigned to any one code word within the example system discussed in connection with FIGS. 4-8. Therefore, by reordering the code illustrated in FIG. 8, the effective code space can be increased to $\log_2$ (32)=5 bits. An example of such a reordering is illustrated in FIG. 9, which contains 32 user values 900 (0-31) allocated among the 30 available binary codes 904. In particular, the reordered code illustrated in FIG. 9 allocates the code word 808 having a decimal equivalent of 30 to user values 900 28 and 29, and the code word 908 having a decimal equivalent of 31 to user values 900 30 and 31. For each of the user values 900 having a shared binary code 908, the shared value is listed as a neighbor 912. However, it will be noted that the maximum variance 916 remains at +/−1. Accordingly, the number of user values 900 equals the number of possible binary codes 908 for maximum efficiency, without violating the selected maximum tolerable deviation. Furthermore, as with the code illustrated in FIG. 8, the maximum tolerable deviation is maintained at the desired level, even when the dominant errors of the system occur, without requiring the use of redundant bits.

It will also be noted that the additional user values added in FIG. 9 are at the upper range of those user values 900. This is advantageous because, values 28 and 29 are, according to the illustrated coding scheme, indeterminate from one another, as are user values 30 and 31. This ensures that the maximum user value inaccuracy introduced by assigning two user values to a single code word is as small as possible, as the smallest percentage change between user values occurs at the upper range of those values.

Although the foregoing discussion has been in terms of integer user values, the present invention is not so limited. In particular, any numerical increment or non-numeric value may be assigned to the user values. Furthermore, when determining the maximum number of neighbor words that any one code word can have, that number can be determined by converting the maximum tolerable deviation to an equivalent distance between code words and multiplying by two.

From the above description, it can be appreciated that the present invention may be used in connection with any numbering system. Therefore, it can be applied in connection with m-ary codes, and is not limited to binary codes such as those in the examples given above.

Furthermore, it should be appreciated that the present invention may be used in connection with any system used in the transmission of data that is characterized by having dominant errors, and that can tolerate at least some deviation between an original signal and a received signal.

According to the present invention, a method and apparatus concerning a high efficiency, error minimizing code are disclosed. In particular, the present invention provides for a high efficiency code scheme that does not require the use of redundant characters.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of encoding data in digital communication systems for reducing effect of errors comprising the steps of:

providing a communications channel having *a circuit at first and second ends of the communications channel and* a code space with a plurality of code words;

determining dominant error events for said communications channel including effects of said dominant error events on said code words in said code space;

assigning user values to said code words in said code space;

determining a maximum tolerable deviation between user values submitted to transmission at [a] *the* first end of said communications channel and corresponding user values as received at [a] *the* second end of said communications channel;

forming groups of interdependent code words in said code space based on said dominant error events;

multiplying the maximum tolerable deviation by two to obtain a maximum number of code words, that may directly interdepend with any code word;

removing code words from said code space, so that no code words having more than M directly interdependent code words remain in said code space.

2. The method of claim 1 further including the step of:

reassigning user values to the non-removed code words, such that occurrence of a dominant error results in a received user value that is within the maximum tolerable deviation for all user values assigned to the non-removed code words.

3. The method of claim 2 including the steps of:

reassigning two or more user values to one code word.

4. The method of claim 1, wherein said code words are expressed as m-ary code.

5. The method of claim 1, wherein said communications channel comprises a channel of a computer disk drive.

6. A method of encoding data in digital communication systems for reducing effect of errors comprising the steps of:

providing a communications channel having *a circuit at first and second ends of the communications channel and* a code space with a plurality of code words;

determining a dominant error event for said communications channel including effects of said dominant error event on said code words in said code space;

assigning user values to said code words in said code space;

determining a maximum tolerable deviation between user values submitted to transmission at [a] *the* first end of said communications channel and corresponding user values as received at [a] *the* second end of said communications channel;

forming groups of interdependent code words in said code space based on said dominant error event;

multiplying the maximum tolerable deviation by two to obtain a maximum number of code words, M, that directly interdepend with any code word;

removing code words from said code space, so that no code words having more than M directly interdependent code words remain in said code space.

7. The method of claim 6 further comprising:

determining a second dominant error event for said communications channel.

8. The method of claim 6 further including the step of:

reassigning user values to the non-removed code words, such that occurrence of a dominant error results in a received user value that is within the maximum tolerable deviation for all user values assigned to the non-removed code words.

9. The method of claim 8 including the steps of:

reassigning two or more user values to one code word.

10. The method of claim 6, wherein said code words are expressed as m-my code.

11. The method of claim 6, wherein said communications channel comprises a channel of a computer disk drive.

12. The method of claim 6, wherein said communications channel can tolerate a difference between a user value as transmitted and a user value as received.

*13. An apparatus for encoding data comprising:*

*a decoder circuit configured to*

*communicate data that is encoded using a code space having a plurality of code words that are correlated to user values;*

*determine dominant error events and an effect of the dominant error events on the code words in the code space;*

*identify groups of interdependent code words in said code space based on the effect of the dominant error events on the code words;*

*determine a limit for the number of code words in the identified groups;*

*modify the code space by removing code words from said code space based upon the determined limit and the identified groups; and*

*communicate data that is encoded using the modified code space.*

*14. The apparatus of claim 13, wherein the decoder circuit is configured to communicate with a storage circuit and wherein the determined dominant error events include dominate error events associated with memory accesses to the storage circuit.*

*15. The apparatus of claim 13, further including a non-volatile storage circuit that is linked to the decoder circuit over a communications channel and wherein the dominant error events are associated with differences between user values stored in the storage circuit and user values determined from code words received at the decoder circuit.*

*16. The apparatus of claim 13, wherein the decoder circuit is configured to assign user values to the code words of the modified code space as a function of differences in the user values and the identified groups.*

* * * * *